Sept. 10, 1940.    P. F. ZIEGLER ET AL    2,214,006
METHOD OF MAKING CREPED PRESSURE-SENSITIVE ADHESIVE MATERIAL
Filed May 14, 1934
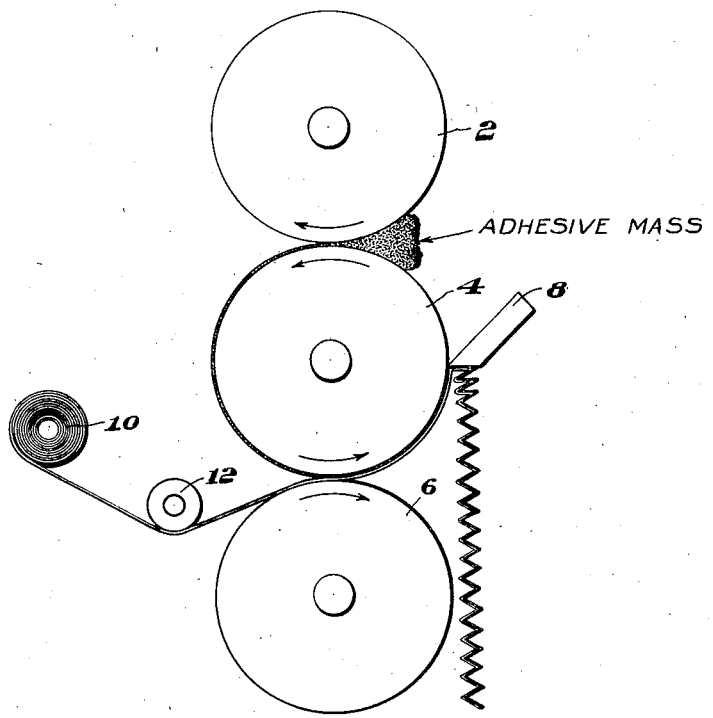
INVENTORS
Paul F. Ziegler and
BY Karl Cedric Hoeglund
H F Kirkpatrick their
ATTORNEY Patented Sept. 10, 1940

2,214,006

UNITED STATES PATENT OFFICE 2,214,006

METHOD OF MAKING CREPED PRESSURE-SENSITIVE ADHESIVE MATERIAL

Paul F. Ziegler, Evanston, and Karl Cedric Hoeglund, Chicago, Ill., assignors to The Kendall Company, Boston, Mass., a corporation of Massachusetts Application May 14, 1934, Serial No. 725,424

16 Claims. (Cl. 154—33)

This invention relates to a method of making creped pressure-sensitive adhesive material and has particularly to do with the manufacture of such material employed principally as masking tape, though it is also employed for various other useful purposes. The invention resides in the treatment, manipulation and application to paper (or other thin flexible backing) of a viscous plastic pressure-sensitive adhesive material which remains pressure-sensitive at normal atmospheric temperatures, and in controlling the condition of the said material not only during the treatment, sheeting and application thereof to the paper backing material, but also, as hereinafter more fully described, during the creping of the product, and in performing all these operations by and in a simple three roll calender in a single operation.

In the typical commercial method employed in the manufacture of pressure-sensitive adhesive paper for masking tape, a relatively strong, and hence expensive, paper is required because it is first subjected to a separate creping operation before the application of adhesive thereto. Also, a relatively non-viscous liquid adhesive is necessarily required because it is applied to such previously creped paper and must have the capacity to easily flow and cover the sharp transverse ridges and hollows thereof. In order to render a suitable adhesive sufficiently fluid or liquid for the purpose of application to crinkled paper, solvents and/or dispersing agents are required with consequent waste, expense and even possible danger if the solvent is inflammable. It is true that the waste of the solvent can be avoided by a solvent recovery system, but that also is a source of trouble and expense. The method of this invention as herein described avoids the difficulties and disadvantages of such prior practice, for no solvent or dispersing agent is required and there is provided a direct application, to the sheet backing, of the adhesive in the same physical condition as normally thereafter used, and which backing, with the adhesive applied thereto—and thereby reenforced—is then crinkled or creped and ready for immediate use without curing or any other subsequent treatment. Other advantages of the invention will be apparent from the description herein and from the drawing in which the figure diagrammatically illustrates, in a general way, apparatus employed in the process of this invention.

Referring to the drawing which illustrates suitable apparatus for the practice of this invention, there is shown a three roll calender group, top, center and bottom rolls numbered, respectively, 2, 4 and 6,—the center of said rolls, having in contact therewith, as hereafter more fully described, a doctor blade 8. There is also shown a roll 10 carrying the paper supply from which the paper is led around a roll 12 and between the center and bottom calender rolls 4 and 6. In the method of this invention the pressure-sensitive adhesive mass (for example a rubber, rosin and plasticizer mixture, with or without zinc oxide) is placed between the slightly spaced top and center calender rolls 2 and 4, by which it is kneaded and milled to a definite temperature and then extruded to a thin sheet of definite predetermined thickness. The precise spacing of the said rolls is regulated or adjusted in accordance with the thickness to which it is desired to sheet the adhesive material upon the center calender roll. The rolls 2 and 4 are both preferably heated, though to relatively different temperatures. The top roll being heated to say 240° F. ±20° and the center roll to 105° F. ±50°. By so heating the rolls the relatively high temperature of the top roll serves not only to assist in maintaining the adhesive mass at an elevated temperature, but also prevents adherence of said mass to the top roll so that the mass becomes sheeted in a thin layer of uniform thickness upon the moving surface of the center calender roll and is carried downwardly towards where the paper backing is applied thereto. At the nip of the center and bottom rolls, there is led between the adhesive layer thus formed and the bottom roll, the strip of paper which, because of the pressure of the bottom roll thereagainst, is caused to tightly adhere to the sheeted adhesive material and continues with it about the moving middle roll to the doctor blade 8. This doctor is not only closely pressed against the roll, as is common in the art, but, in addition, preferably by a suitable electrical resistance unit (not shown) is heated to a somewhat elevated temperature, preferably 215° F. ±20°, to control and preferably maintain substantially constant the degree of resistance offered by the face of the doctor blade to the movement of the adhesive layer with its paper backing forced thereagainst. Thus the character and result of the operation is controlled not only by the temperature at which the adhesive mass is applied in sheeted form to the center roll, but by the maintenance of the desired temperature by the center roll until the adhesive mass encounters the resistance of the heated doctor blade which, due to its temperature control, is substantially constant and provides a uniform knife or doctor resistance (for any given take-off angle) to the moving layer of adhesive. The doctor resistance is also affected by the angle (ordinarily 90°±20°) between the active surface thereof and the center roll, and this in turn affects the size of the crepe and number per inch of length of the paper. If it is desired to decrease the number of crepes per inch, this can be done by increasing the temperature of the doctor blade and without changing its angle; by increasing the temperature of the middle roll, or both, conversely, if it is desired to increase the number it can be done by decreasing the temperature of the doctor; by decreasing that of the middle roll; or both. Also, crepe size may be varied by changing the take-off angle of the doctor. The degree of tackiness is to some extent regulated by the temperature of the creping knife and, in general, varies with temperature. Naturally, the pull off tension on the creped product should be kept low,—just enough to insure removal so as to retain the maximum crepe as imparted to the paper.

In the foregoing specification and in the appended claims, the backing material is referred to as "paper" but it will be appreciated that anyone of various other thin flexible backings may be employed and therefore the word "paper" in said claims is to be construed as covering other functionally equivalent backings.

Having described our invention, what we wish to claim and secure by Letters Patent is:

1. That step in the method of making creped pressure-sensitive adhesive paper which consists in scraping with a heated doctor blade from a revolving roll a layer of adhesive material sheeted thereon having a layer of paper adherent to said sheeted material thereby creping said paper and adherent mass.

2. That step in the method of making creped pressure-sensitive adhesive paper which consists in scraping with a heated doctor blade from a heated revolving roll a layer of adhesive material sheeted thereon having a layer of paper adherent to said sheeted material thereby creping said paper and adherent mass.

3. The method of making creped pressure-sensitive adhesive paper which consists in sheeting a layer of viscous plastic adhesive material upon a moving roll and applying to the exterior thereof a strip of paper, and then scraping with a heated doctor blade from said roll the layers of adhesive material and adherent paper thereby creping the same.

4. The method of making creped pressure-sensitive adhesive paper which consists in advancing on a moving roll a layer of viscous plastic adhesive material having a layer of paper adherent to the exterior thereof and then scraping with a heated doctor blade from said roll said adhesive material and paper thereby creping the same.

5. The method of making creped pressure-sensitive adhesive paper which consists in depositing a mass of viscous plastic adhesive material between convergingly moving adjacent surfaces of slightly spaced rolls of a calender and thereby contact with said surfaces kneading said mass, continuously passing said material between said rolls and sheeting it in a thin layer upon the surface of a calender roll, continuously feeding a strip of paper into surface contact with said layer and pressing it thereagainst, and then by a doctor blade scraping said sheeted mass and attached paper from said calender roll to provide layers of adhesive and backing with substantially co-extensive crepings, with the adhesive material in normal physical condition ready for immediate use, meanwhile maintaining a tension upon the creped adhesive coated paper, and continuously pulling said creped adhesive coated paper from said doctor blade.

6. The method of making creped pressure-sensitive adhesive paper which consists in depositing a mass of viscous plastic adhesive material between convergingly moving adjacent surfaces of slightly spaced rolls of a calender, continuously passing said material between said rolls and sheeting it in a thin layer upon the surface of a calender roll, continuously feeding a strip of paper into surface contact with said layer and pressing it thereagainst, and then by a heated doctor blade scraping said sheeted mass and attached paper therefrom thereby creping the same, meanwhile maintaining a tension upon the creped adhesive coated paper, and continuously pulling said creped adhesive coated paper from said doctor blade.

7. The method of making creped pressure-sensitive adhesive paper which consists in depositing a mass of viscous plastic adhesive material between convergingly moving adjacent surfaces of slightly spaced rolls of a calender and thereby contact with said surfaces kneading said mass, one of said rolls being heated to a temperature of 240° F. ±20° to assist in maintaining said material at an elevated temperature and to prevent adherence of said material to said roll, continuously passing said material between said rolls and sheeting it in a thin layer upon the surface of the calender roll opposing said highly heated roll and maintaining said layer at a substantially constant temperature, continuously feeding a strip of paper into surface contact with said layer, and pressing it thereagainst, and then by a doctor blade scraping said sheeted mass and attached paper from said calender roll to provide layers of adhesive and backing with substantially co-extensive crepings, with the adhesive material in substantially normal physical condition ready for immediate use, meanwhile maintaining a tension upon the creped adhesive coated paper and continuously pulling said creped adhesive coated paper from said doctor blade.

8. The method of making creped pressure-sensitive adhesive paper which consists in depositing a mass of viscous plastic adhesive material between convergingly moving adjacent surfaces of slightly spaced heated rolls of a calender and thereby contact with said surfaces kneading said mass, one of said rolls being heated to a relatively higher temperature than the other to assist in maintaining said material at an elevated temperature and to prevent adherence of said material to said roll, continuously passing said material between said rolls and sheeting it in a thin layer upon the surface of the calender roll opposing said highly heated roll, continuously feeding a strip of paper into surface contact with said layer and pressing it thereagainst, and then by a doctor blade scraping said sheeted mass and attached paper from said calender roll to provide layers of adhesive and backing with substantially co-extensive crepings, with the adhesive material in substantially normal physical condition ready for immediate use, meanwhile maintaining a tension upon the creped adhesive coated paper and continuously pulling said creped adhesive coated paper from said doctor blade.

9. The process of making a creped pressure-sensitive adhesive sheet which comprises kneading and applying a non-fluid adhesive mass on a calender to a backing material and directly removing and simultaneously creping the same to provide layers of adhesive and backing, with substantially co-extensive crepings, ready for packaging with the adhesive material in substantially normal physical condition ready for immediate use, by means of a doctor blade operative against one of the calender rolls.

10. The method of making a pressure-sensitive adhesive material which comprises kneading and continuously spreading a sheet of highly viscous pressure-sensitive adhesive on a roll and with the said sheet adherent to said roll, then pressing against said adhesive sheet a non-adhesive preformed flexible paper-like sheet and thereby causing the same to firmly adhere to said adhesive sheet, and subsequently and continuously together scraping said adhesive sheets and non-adhesive sheets from said roll and thereby forming a shortened integral structure, having layers of adhesive and backing, with substantially co-extensive crepings, and of less length than the length of the non-adhesive sheet applied to said roll.

11. The process of making a creped pressure-sensitive adhesive sheet which comprises depositing a highly cohesive plastic means of adhesive between two spaced rotating rolls of a calender and there continuously kneading the same co-incidentally causing a portion of said cohesive mass to pass between said rolls in a thin sheet upon the surface of one of the said rolls, subsequently pressing a piece of backing material against said sheet while still upon said roll, and creping while simultaneously removing the said sheet and the said backing material from said roll by means of a doctor blade pressing against the roll, whereby to produce a shortened structure, having layers of adhesive and backing, with substantially co-extensive crepings, and of less length than the sheet as formed on said roll.

12. The process of making a creped pressure-sensitive adhesive sheet which comprises kneading and spreading a non-fluid viscous plastic adhesive mass on a surface in a layer of uniform thickness, applying thereto a backing material, and removing said combined material from said surface while simultaneously creping the same to provide layers of adhesive and backing, with substantially co-extensive crepings, ready for packaging with the adhesive material in substantially normal physical condition, ready for immediate use.

13. The method of making creped pressure-sensitive adhesive paper which consists in kneading and spreading a solidified, viscous, plastic adhesive material on a smooth surface, applying to the exposed exterior of said material a strip of paper, and then removing by scraping with a blade from said surface the layers of adhesive material and adherent paper, thereby creping the same.

14. The process of making a creped pressure-sensitive adhesive sheet which comprises depositing a non-fluid viscous plastic adhesive mass between relatively moving surfaces and continuously extruding adhesive therethrough thereby forming directly from said mass a layer of predetermined and uniform thickness of said non-fluid viscous plastic adhesive adherent to one of said surfaces, applying to said mass a backing material and removing said combined material from said surface while simultaneously creping the same to provide layers of adhesive and backing, with substantially co-extensive crepings, ready for packaging with the adhesive material in substantially normal physical condition, ready for immediate use.

15. The method of making creped pressure-sensitive adhesive paper which consists in depositing a solidified, viscous, plastic adhesive material between relatively moving surfaces and extruding said viscous plastic material therethrough and thereby directly forming a layer of said material of predetermined and uniform thickness adherent to one of said surfaces, applying to the exposed exterior of said material a strip of paper, and then removing, by scraping with a blade from said surface the layers of adhesive material and adherent paper, thereby creping the same.

16. The process of making a creped pressure-sensitive adhesive sheet which comprises depositing a highly cohesive plastic mass of adhesive between two spaced rotating rolls of a calender and there continuously kneading the same co-incidentally causing a portion of said cohesive mass to pass between said rolls in a thin sheet upon the surface of one of said rolls, subsequently pressing a piece of backing material against said sheet while still upon said roll and then removing said combined material from said surface while simultaneously creping the same to provide layers of adhesive and backing, with substantially co-extensive crepings, ready for packaging with the adhesive material in substantially normal physical condition, ready for immediate use.

PAUL F. ZIEGLER.
KARL CEDRIC HOEGLUND.

CERTIFICATE OF CORRECTION.

Patent No. 2,214,006. September 10, 1940.

PAUL F. ZIEGLER, ET AL.

It is hereby certified that error appears in the printed specification of the above numbered patent requiring correction as follows: Page 3, first column, line 29, claim 11, for the word "means" read --mass--; and that the said Letters Patent should be read with this correction therein that the same may conform to the record of the case in the Patent Office.

Signed and sealed this 15th day of October, A. D. 1940.

(Seal)

Henry Van Arsdale,
Acting Commissioner of Patents.